United States Patent [19]

Vinz

[11] 4,121,653
[45] Oct. 24, 1978

[54] METHOD OF CONSTRUCTING ROOMS WITH RADIANT HEATING OR WITH COOLING

[76] Inventor: Siegfried Vinz, Neuwiesenrebenstrasse 44, D-7505 Ettlingen, Fed. Rep. of Germany

[21] Appl. No.: 759,414

[22] Filed: Jan. 14, 1977

[30] Foreign Application Priority Data

Jan. 15, 1976 [DE] Fed. Rep. of Germany ....... 2601258

[51] Int. Cl.² .............................................. F24H 9/08
[52] U.S. Cl. ........................................ 165/1; 165/49; 165/168
[58] Field of Search ................. 165/49, 168, 1; 98/31; 237/45, 49

[56] References Cited

U.S. PATENT DOCUMENTS 1,771,269   7/1930   Musgrave et al. ..................... 165/49

FOREIGN PATENT DOCUMENTS 301,734   9/1954   Switzerland ................................ 165/49
897,749   5/1962   United Kingdom ....................... 165/49
1,137,202   12/1968   United Kingdom ..................... 165/49

Primary Examiner—Charles J. Myhre
Assistant Examiner—Margaret A. LaTulip
Attorney, Agent, or Firm—Craig & Antonelli

[57] ABSTRACT

A method is provided of constructing rooms provided with a radiant heating system or a cooling system comprising radiant or cooling panels connected to the walls, the ceiling, or the floor of each room and forming a thermal medium cavity, wherein there may circulate a thermal medium which transmits heat to the radiant panels or receives heat from the cooling panels. At least the walls and the ceiling are pre-fabricated components capable of bearing static loads and the interiors of the walls and the ceiling, facing the remainder of the room and the panels, contain respective pairs of adjacent parallel troughs of curved or part-polygonal cross-section. The troughs in the walls are vertical and the ceiling is applied so that they merge streamlined with the troughs in the ceiling. The panels are suspended from supports on the walls and the ceiling with interposition of a resilient packing.

9 Claims, 5 Drawing Figures

METHOD OF CONSTRUCTING ROOMS WITH RADIANT HEATING OR WITH COOLING

The present invention relates to a method of constructing rooms in buildings, the rooms each having a floor, walls, and a ceiling and being provided with a radiant heating system or a cooling system which comprises radiant or cooling panels, respectively, connected to the walls, the ceiling, or the floor and forming a cavity wherein there may circulate a thermal medium which transmits heat to the radiant panels or which receives heat from the cooling panels.

Many types of radiant panel heating system for dwelling rooms and the like have already been previously proposed, and they are preferable to convection heating because they give an impression of greater comfort. They have generally been used for underfloor and/or ceiling heating. In a method of construction invariably used, a structure is first erected in a conventional manner, with, for example, walls of composite construction, ferroconcrete, or the like, and the heating is installed subsequently. Finishing operations on the walls, the ceiling, and the floor are required in order to instal the radiant panels, any insulation, and thermal transfer means. Excess heat contained in a thermal transfer medium is not generally used to the full, since both thermal insulation relative to the external walls and means for guiding air and the thermal medium behind the radiant panels are inadequate.

According to the present invention, we provide a method of constructing rooms each having a floor, walls, and a ceiling and being provided with a radiant heating system or a cooling system which comprises radiant or cooling panels, respectively, connected to the walls, the ceiling, or the floor of that room and forming a thermal medium cavity wherein there may circulate a thermal medium which transmits heat to the radiant panels or which receives heat from the cooling panels, in which method at least the walls and the ceiling are pre-fabricated components capable of bearing static loads and the interiors of the walls and the ceiling, which interiors face the remainder of the room and the radiant or cooling panels, contain respective pairs of adjacent parallel troughs of curved or part-polygonal cross-section, the troughs in the walls being vertical and the ceiling being applied so that they merge in streamlined manner with the troughs in the ceiling, and the panels are suspended from supports on the walls and the ceiling with interposition of a resilient packing.

The present method is based primarily on use of two components, viz. a pre-fabricated load-bearing component and the radiant or cooling panels, which can also be pre-fabricated, and both of which can be readily assembled on site. The parallel troughs in the walls and ceiling ensure satisfactory convection, and at the same time they act as heat reflectors like concave mirrors, reflecting the heat towards the radiant panel. The resilient packing for the supports eliminates heat and sound bridges between the walls or the ceiling and the radiant or cooling panels.

The supports are preferably comprised by a support web which runs across the entire width of, and transversely to, the respective troughs and which is inserted into ribs between those troughs. Claw-like support means mounted on the radiant or cooling panels are preferably engages over the support web, and the resilient packing is preferably provided between support means and the support web.

Thermal baffles are preferably mounted on a rear of the radiant or cooling panels, preferably extend into the thermal medium cavity, and also preferably constitute mountings for a thermal medium pipe spaced from the radiant or cooling panel. The thermal medium pipe is preferably also attached to the walls or the ceiling by way of thermal baffles, which at least partly embrace the pipe and which pass through the radiant or cooling panel and which are bent over to bear on the front of the panel.

The invention will now be more particularly described with reference to the accompanying drawings, wherein.

Figure 1:
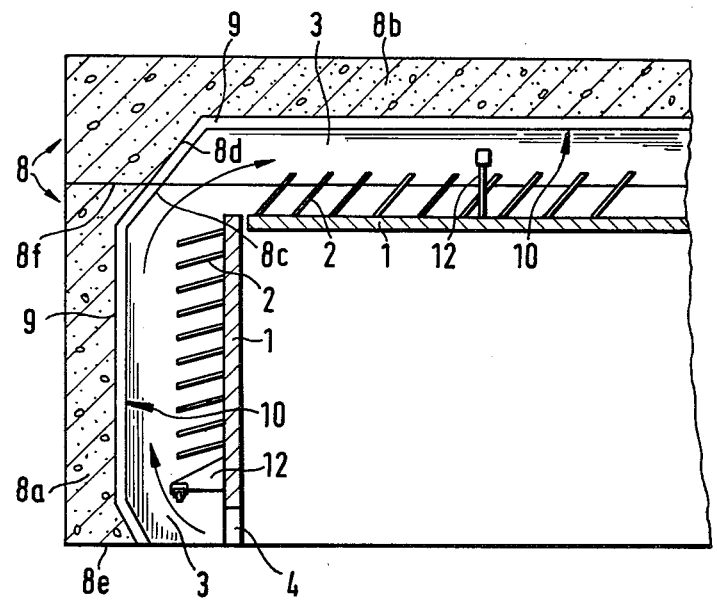
FIG. 1 is an interrupted sectional elevational view of a room.
Figure 4:
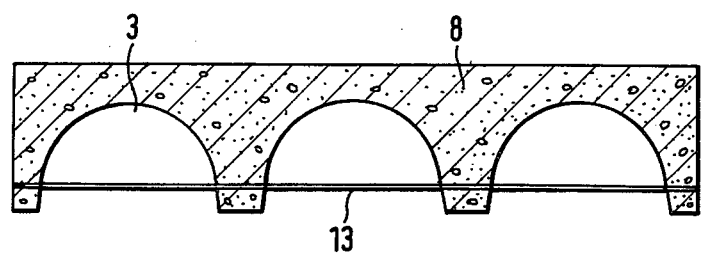
FIG. 4 is a cross-sectional view through a pre-fabricated wall component.

Referring to the drawings, the present method of construction based on factory-made pre-fabricated components 8 (FIGS. 1 and 4), e.g. of ferroconcrete, which form walls 8a (FIG.1), a ceiling panel 8b, and possibly a floor. The pre-fabricated components 8 are formed internally with parallel troughs or a cavity 3, which are vertical in the wall 8a and which have arcuate cross-sections (FIG. 4). The cross-sections may alternatively be parabolic or part-polygonal. The troughs 3 in the walls 8a merge in a streamlined manner by way of inclined surfaces 8c with corresponding inclined surfaces 8d in the troughs 3 in the ceiling panel 8b. These inclined surfaces 8c, 8d also constitute thickened portions in the vicinities of respective bearing end faces 8e, 8f. The interiors of the walls 8a and the ceiling 8b have a layer 9 of heat-reflectant, thermally insulative material, which layer 9 may also at least partly form investment shuttering for moulding of the interiors of the components 8, and which is provided on its exterior, which faces a panel 1, for example with a high-gloss heat-reflectant layer 10.

The radiant panels 1 (FIGS. 2, 3, and 5) are suspended in front of the interiors of the walls 8a and the ceiling 8b. Thermal baffles 2 on rears of the panels 1 project into the cavity 3 between the pre-fabricated components 8 and the panels 1 and into channels formed by the troughs 3. The radiant panels 1 are suspended from the pre-fabricated components 8 by means of supports 12. In an embodiment shown in FIG. 1 there is a gap containing a radiator 4 between the floor and a bottom of the radiant panel 1 suspended in front of the wall 8a. Air may be drawn out of a room and heated by the radiator 4, whereupon it flows up the channels 3 and along under the ceiling panel 8b. Thus the panels 1 terminate short of the floor and are placed over the radiator 4 near the floor.

Figure 2:
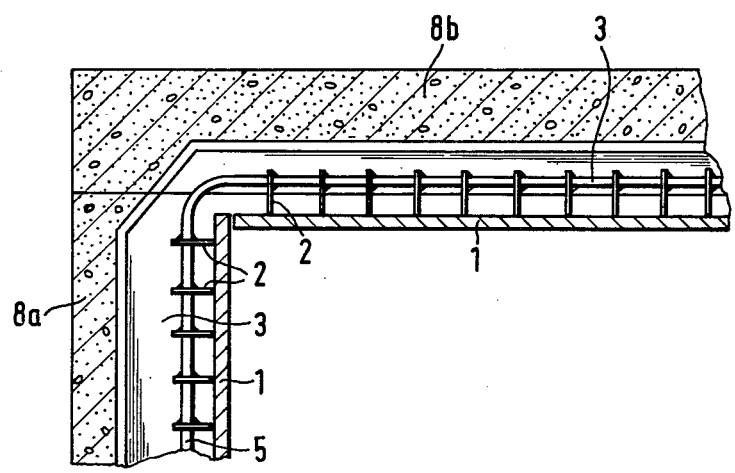
FIG. 2 is a sectional view similar to FIG. 1, but with a different form of radiant panel.
Figure 3:
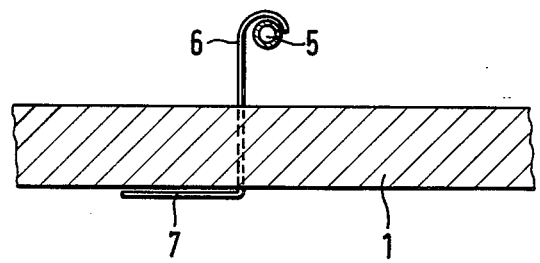
FIG. 3 is a detail showing a thermal connection between a thermal medium pipe and a radiant panel.

An embodiment shown in FIG. 2 has an additional thermal medium pipe 5 mounted in the troughs 3, spaced from the radiant panels 1, and connected to the thermal baffles 2. Additional pipes such as the pipe 5 may be provided. In addition thermal medium pipes 5 or pipes such as 5 may be connected to the radiant panels 1 by baffles 6 (FIG. 3). These baffles 6 are engaged around the pipe 5 or the pipes such as 5 as loops, and ends of the baffles 6 pass through the radiant panel 1, where they are bent along the front of the panel 1, parallel thereto, to form an additional radiant surface.

Figure 5:
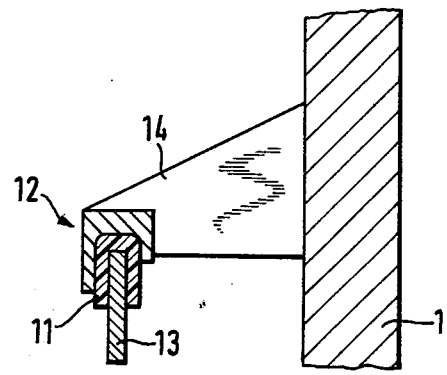
FIG. 5 illustrates suspension of the radiant panel shown in FIG. 3 on the pre-fabricated component shown in FIG. 4.

In an embodiment illustrated in FIGS. 4 and 5 the supports 12 for suspending the radiant panels 1 comprise a support web 13 cast integrally with the pre-fabricated component 8, and claw-like hooks 14 attached to the radiant panels 1. Between the hooks 14 and the web 13 there is a resilient packing 11.

I claim:

1. A method of constructing rooms each having a floor, walls, and a ceiling and being provided with a radiant heating system or a cooling system which comprises radiant or cooling panels, respectively, connected to the walls, the ceiling, or the floor of that room and forming a thermal medium cavity wherein there may circulate a thermal medium which transmits heat to the radiant panels or which receives heat from the cooling panels, in which method at least the walls and the ceiling are pre-fabricated components capable of bearing static loads and the interiors of the walls and the ceiling, which interiors face the remainder of the room and the radiant or cooling panels, contain respective pairs of adjacent parallel troughs or curved or part-polygonal cross-section, the troughs in the walls being vertical and the ceiling being applied so that they merge in streamlined manner with the troughs in the ceiling, and the panels are suspended from supports on the walls and the ceiling with interposition of a resilient packing.

2. A method according to claim 1, wherein the walls and the ceiling have thickened portions in the vicinities of respective bearing end faces.

3. A method according to claim 1, wherein the supports comprise a support web which runs across the entire width of, and transversely to, the respective troughs and which is inserted into ribs between those troughs.

4. A method according to claim 1, wherein thermal baffles are mounted on a rear of the radiant or cooling panels, extend into the thermal medium cavity, and also constitute mountings for a thermal medium pipe spaced from the radiant or cooling panel.

5. A method according to claim 1, wherein the radiant or cooling panels terminate short of the floor and are placed over a radiator near the floor.

6. A method according to claim 1, wherein a layer of thermally insulative material is provided on the interior of the walls or of the ceiling and at least partly forms investment shuttering for moulding of the interiors of the pre-fabricated components.

7. A method according to claim 3, wherein claw-like support means mounted on the radiant or cooling panels are engaged over the support web, and the resilient packing is provided between support means and the support web.

8. A method according to claim 4, wherein the thermal medium pipe is also attached to the walls or the ceiling by way of thermal baffles, which at least partly embrace the pipe and which pass through the radiant or cooling panel and which are bent over to bear on the front of the panel.

9. A method according to claim 6, wherein a heat-reflectant layer is provided on the exterior of the investment shuttering, which exterior faces the radiant or cooling panel.

* * * * *